Patented Apr. 15, 1930

1,755,156

UNITED STATES PATENT OFFICE

EDOUARD URBAIN, OF PARIS, FRANCE, ASSIGNOR TO URBAIN CORPORATION, A CORPORATION OF DELAWARE

BONE BLACK OF GREAT DECOLORIZING POWER

No Drawing. Application filed July 3, 1926, Serial No. 120,535, and in France July 22, 1925.

The ordinary method of producing boneblack consists in first subjecting the bones to a preliminary treatment with boiling water, either in open kettles or closed autoclaves, which is followed by extraction with solvents such as benzine or carbon disulphide. The bones thus freed from fat are crushed and calcined, the temperature of the calcining process being kept below the temperature at which any appreciable dissolution of the calcium carbonate in the bones may take place.

Bone-black is primarily of a structure comprising calcium carbonate and tricalcium phosphate, and its activity is due to carbon deposited on these inert materials during the process of calcination.

According to my present invention, the percentage of carbon in the final product is increased by removing some of the inert material, and the activation of the carbon is conducted under more advantageous conditions than heretofore has been practiced.

The amount of organic matter may be relatively increased by removing some or all of the calcium carbonate, and if desired, a part of the calcium can also be removed from the tricalcium phosphate present. I accomplish such removal by giving the bones a treatment with an acid as a preliminary to the calcination. It is possible to use strong acids such as hydrochloric acid, but if they are employed, considerable care must be taken so to control the conditions that the acid present will not render the tricalcium phosphate soluble, for if this is done the pieces of bone may disintegrate. It is possible to remove most of the calcium carbonate without converting the tricalcium phosphate into a soluble acid phosphate. The removal of calcium carbonate from the bones increases their porosity, which may be of assistance in attaining beneficial results.

In order to avoid the necessity of carefully measuring the amount of acid used, or otherwise controlling the conditions, I prefer to use an acid strong enough to displace the carbonic acid radical, but weak enough so that it will not displace the phosphoric acid radical to the point where tricalcium phosphate is converted into soluble form; at the same time, an acid should be selected, the calcium salt of which is soluble. With an acid of the type described, the bones may be treated as long as desired and then washed to remove the dissolved substances. An acid which I have found well adapted for the purpose is sulphurous acid made by dissolving and maintaining sulphur dioxide in solution in water under pressure. By suitably regulating the pressure of the sulphur dioxide and the duration of the dissolving process, I may bring into solution any desired amount of calcium carbonate and thus can vary the percentage of carbon in the final product.

In order that the carbon deposit may be rendered more active, the bones, from which the desired amount of calcium carbonate has been removed, are immersed in a solution of a substance containing the phosphoric acid radical ($PO_4$) and giving an acid reaction. Such solutions may comprise, for example, phosphoric acid itself or monocalcium phosphate. I prefer to use monocalcium phosphate as it will dissolve but a trace of the tricalcium phosphate in the bones and thus will not harm the structure of the material. The material thus prepared is calcined at a temperature sufficiently high so that the hydrogen compounds of the organic matter in the bones may effect the reduction of the free phosphoric acid. This is evidenced by an evolution of compounds containing hydrogen and phosphorus, and if the temperature is carried sufficiently far there will be an evolution of free phosphorus. The calcined product consists largely of active carbon and tricalcium phosphate with silica as the principal impurity.

The following example is given only by way of illustration, and is not intended to limit my invention:

5 kgs. of defatted bones were analyzed and found to contain the following:

1.34 kg. organic material
2.70 kgs. phosphate of calcium and magnesium
0.45 kg. calcium carbonate
0.31 kg. silica
0.20 kg. sodium, potassium, iron, aluminum, etc.

These bones were crushed to 3 to 4 mesh size.

The material was then treated in the cold with a water solution of sulphur dioxide under a pressure of about one atmosphere above normal. The bones were left in the acid until after washing, it was found that they had lost .8 kg. of their weight. The residue contained 2.43 kg. of calcium and magnesium phosphates and substantially no calcium carbonate. This product was immersed in a solution of monocalcium phosphate (15° Bé.) drained, dried and calcined at increasing temperatures until substantially all the hydrogen-phosphorous compounds had been evolved and there was an evolution of free phosphorus. The final product weighed 3.34 kg. and its decolorizing power was found to be about five times greater than that of ordinary bone-black.

What I claim is:

1. In the process of producing bone-black of great decolorizing power, the steps of treating pieces of bone with acid under conditions adapted to remove calcium carbonate from such pieces without causing them to disintegrate, and thereafter calcining the residue of such pieces.

2. A process as defined in claim 1, in which the acid used is one adapted to form a soluble calcium salt, is strong enough to displace the carbonic acid radical and is not sufficiently strong to displace the phosphoric acid radical to the point where tricalcium phosphate is converted into soluble form.

3. A process as defined in claim 1, in which the acid used is sulphurous acid applied under pressure.

4. A process as defined in claim 1, further characterized by the fact that the residual pieces of bone are, before calcination, impregnated with a solution of a substance comprising the $PO_4$ radical, and given an acid reaction.

EDOUARD URBAIN.